Sept. 2, 1941.         E. OLSON ET AL         2,254,974
TIRE REGROOVING TOOL
Filed March 30, 1939
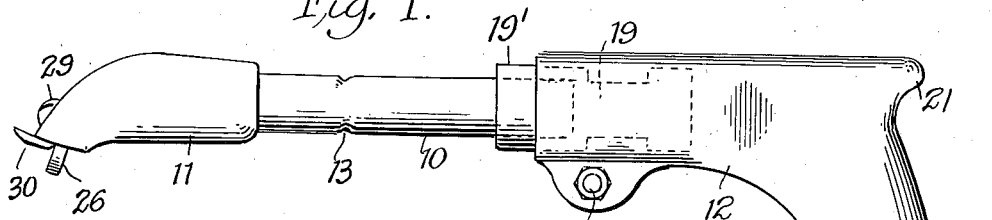
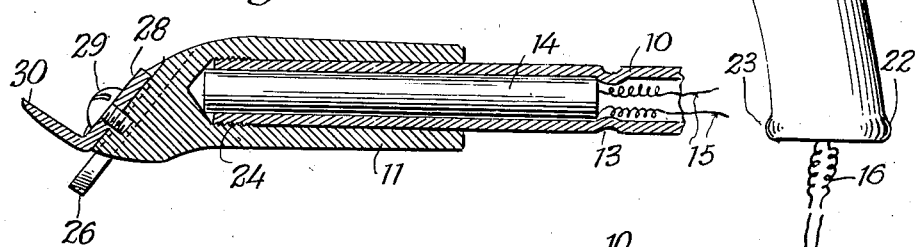
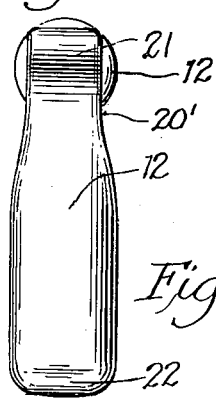
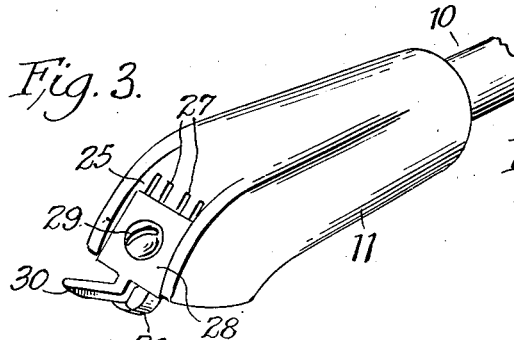
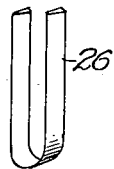
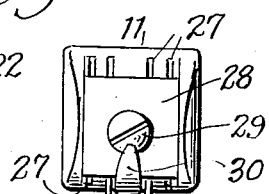
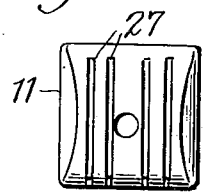
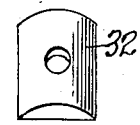
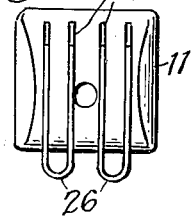
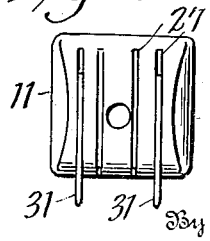
Inventor
Eugene Olson,
Edgar S. Johnson
by A. W. Dahn
Attorney Patented Sept. 2, 1941

2,254,974

UNITED STATES PATENT OFFICE 2,254,974

TIRE REGROOVING TOOL

Eugene Olson and Edgar S. Johnson, Chicago, Ill., assignors to Triangle Tire & Battery Service, Chicago, Ill., a partnership Application March 30, 1939, Serial No. 265,028

4 Claims. (Cl. 30—140)

Our invention relates to a tire regrooving tool for deepening the grooves in a worn tire or for cutting new grooves if the old ones have disappeared, and also for cutting grooves in the face of a retreaded tire or the like. It is an object of our invention to provide a tool of this character with a head so constructed and arranged as to be capable of being heated in a very efficient manner with low consumption of electric current, for heating the cutting blade or blades to cut rubber rapidly and easily.

Another object of the invention is to provide a tool of this character with a barrel carrying the head and with a handle insulated from the barrel, this handle being so formed as to be exceptionally comfortable and convenient to the hand of the user.

Another object of the invention is to provide improved blade holding means on the head of the tool, said holding means comprising slots in the inclined front face of the head, together with readily removable gripping means for holding the blade or blades, the arrangement being such that the blades can be readily adjusted to vary the depth and the width of the cut.

Another object of the invention is to provide an improved guiding means for the tool.

Referring to the drawing, which is made a part of this application and in which similar reference characters indicate similar parts;

Fig. 1 is a side elevation of the tool, on a reduced scale;

Fig. 2, a vertical section of the front end of the tool, on a larger scale;

Fig. 3, a perspective of the head of the tool;

Fig. 4, a perspective of a preferred type of cutting blade;

Fig. 5, a front elevation of the head;

Fig. 6, a similar elevation with the blade and holding means omitted;

Fig. 7, a similar elevation showing a pair of blades for cutting parallel grooves;

Fig. 8, a similar elevation with a pair of blades of different type;

Fig. 9, a perspective of a different holding means, and

Fig. 10, a rear elevation of the handle.

In the drawing, reference character 10 indicates the barrel of our tire regrooving tool, said barrel carrying a head 11 and being povided at its other end with a handle 12.

The barrel is circumferentially indented at 13 so as to provide an internal rib serving to hold a heating unit 14 in place at its forward end, this heating unit being provided with nichrome wire embedded therein to afford a durable construction using but little current and making it inexpensive to operate. Conductors 15 lead back from the heating unit through the barrel and hollow handle and through a coil spring cord guide 16 to a rubber plug 17 having spring prongs 18. The handle is insulated from the barrel by means of a sleeve 19 of wood, such as hard maple, this sleeve being enlarged at its ends to fit in the end of the hollow handle and being reduced in thickness between its ends. The sleeve is permanently secured to the barrel as by a metal collar 19' and is hollowed out for passage of the conductors therethrough. The bore of this sleeve provides a safe and convenient place for storage of extra cutting blades which hold themselves in place in this bore by the resilient grip of the ends of their legs against the wall thereof. The forward end of the handle fits closely over the sleeve at both sides of a bolt 20 which passes through ears in a split portion of the handle below said insulating sleeve, so that this part of the handle can be clamped on the sleeve but can readily be removed from the remainder of the tool when desired.

The handle 12 is preferably made of metal such as aluminum and is shaped to fit the hand nicely, but flattened at the sides as indicated at 20' and has rearward projections at 21 and 22 and a forward projection at 23 to insure a good grip, yet to permit the handle to be held with a minimum of effort on the part of the user. This construction provides a very durable tool, since even if the sleeve should split it cannot get away, and there is no such wear on the sleeve as there is on a wooden handle, nor does roughening of the sleeve inconvenience the user as in the case of a roughened wooden handle.

It will be noted in Fig. 2 that the head 11 of brass, copper or the like is bulky and extends far back on the barrel so as to embrace the greater part of the heating unit 14 and thus to heat the head most effectively and with a minimum waste of heat, the heating unit being held in place at the front of the barrel by the rib at 13 and the head being threaded to the forward end of the barrel as shown at 24. At its forward end the head has an inclined face 25 sloping forwardly to give an appropriate position to a cutting blade such as that shown at 26, this cutting blade being made of specially hardened or spring steel or the like and being brought to a cutting edge at its front portion. The inclined face is provided with a suitable number of vertically extending slots 27 (preferably four or more)

of suitable width to receive the legs of the blade 26. The width of the legs of this blade is such that they will project slightly outward beyond the plane of the face at 25 and they are clamped securely in place by means such as a plate 28 of steel or other hard metal, arranged to bear against the outer edges of the legs of the cutter and being secured in clamping relation to the head by means of a single screw 29 entering a threaded opening in the head thus providing a very simple means for clamping and releasing the cutters, as for removal and replacement of the same. The preferred relation of slots and threaded opening is indicated in Fig. 6, but obviously other arrangements may be used, as desired.

An important feature of our invention consists in the stiff, hard metallic guide 30 which is preferably integral with the plate 28 and extends forwardly from the tool midway between its sides, in a position to follow an original groove in a tire or to follow a line marked with a caliper, thereby making it easy to do even and neat work, it being located exactly to locate the blade 26 with reference to the line to be followed.

Fig. 7 illustrates an arrangement suitable for cutting a pair of grooves simultaneously in a tire of the type used on passenger cars, while the form previously described is more suitable for cutting a single groove in such a tire. It will be readily seen that the same spring blade, or a specially made blade if desired, can have its legs inserted in slots more widely spaced on the head; e. g., in the pair of slots most remote from one another for cutting a wide groove such as those found on truck tires. Fig. 8 shows an arrangement such as is preferred for cross cutting a tire; i. e., cutting grooves transversely of the tread, and for that purpose a spring steel blade 26 may be broken to provide a pair of straight blades 31 adapted to be mounted in suitably spaced slots.

For situations where the guide 30 is not needed we provide a special blade holding plate such as that shown at 32 in Fig. 9. It will be noted that for all of these arrangements adjustment of a single screw provides for clamping the cutting blades in place and for releasing the plate as to permit exchanging of the blades, and the same screw also positions the groove guide 30 and fixes it in place.

It will be obvious to those skilled in the art that many changes may be made in the details of our device, all without departing from the spirit of our invention, and therefore we do not limit ourselves to what is shown in the drawing and described in the specification but only as required by the state of the prior art.

It will be understood also that, while we refer to the tool of our invention as a tire regrooving tool as a convenient term, this is merely as a matter of description and not of limitation, since it is obvious that the tool is adapted for use in other ways, as for cutting new grooves in a vulcanized part of a tire, etc.

Having thus fully described our invention what we claim is:

1. In a tire regrooving tool, a hollow barrel adapted to receive and fit closely about a heating device, a head at the front of said barrel, the front end of said head having a face with a plurality of vertical slots, means for clamping blades in said slots, said means comprising a plate lying on the front face of said head, means for securing said plate to said head, and a guide extending forward from said plate in position to follow a groove that is being deepened.

2. In a tire regrooving tool, a head of relatively soft heat-conducting metal, cutting means carried by said head, and a detachable guide member of relatively hard metal located centrally of the front end of said head for the purpose described.

3. In a tire regrooving tool, a head of relatively soft heat-conducting metal, said head having parallel slots in its front face to receive a U-shaped cutting blade, a face plate for holding said blade in said slots, means for securing said face plate in place and a guiding projection extending forward from said plate, said plate and projection consisting of relatively hard metal.

4. In a tire regrooving tool, a head of relatively soft heat-conducting metal, said head having parallel slots in its front face to receive a U-shaped cutting blade, a face plate for holding said blade in said slots, a screw passing through said plate and engaging a threaded opening in the head, a guiding projection extending forward from said plate, said plate and projection consisting of relatively hard metal.

EUGENE OLSON.
EDGAR S. JOHNSON.